Aug. 26, 1969    M. COOPERSTEIN    3,463,380

CLOSURE DEVICE FOR MILK CARTON

Filed March 15, 1968

INVENTOR
MITCHELL COOPERSTEIN
BY
Morse, Altman + Oates
ATTORNEYS

United States Patent Office 3,463,380
Patented Aug. 26, 1969

3,463,380
CLOSURE DEVICE FOR MILK CARTON
Mitchell Cooperstein, 320 Blue Hill Parkway,
Milton, Mass. 02187
Filed Mar. 15, 1968, Ser. No. 713,383
Int. Cl. B65d 45/04, 45/16
U.S. Cl. 229—45     1 Claim

ABSTRACT OF THE DISCLOSURE

An inverted channel member is mounted on the top ridge of a milk carton to pinch shut the forward portion of the ridge which has been split to unfold a spout for pouring the milk, the spout having been refolded to close the carton, the member being movable to an inactive position without being detached from the carton.

---

This invention relates to closure devices for mlik cartons which have been opened. Fluid milk which is sold in markets is now usually packaged in cartons made of cardboard coated with a waterproof plastic to make them fluid-tight. The customary shape is rectangular, the body of the carton having a square cross-section, the upper portions having the end walls folded in to bring the side walls together in the form of a gable, the upper extremities being pressed together and sealed to form a top ridge.

To open the carton for the discharge of the contents, the forward half of the top ridge is adapted to be split apart so that the folds of the front wall can be reversely bent to form a pouring spout. When the desired quantity of milk has been poured from the carton, the portion of the front wall forming the spout is folded back and the parts of the divided portion of the ridge are brought together to the original closed condition. However, owing to the relatively low degree of resilience of the cardboard, the parts of the split portion of the ridge do not come closely together but leave a small gap through which the atmosphere has access to the interior of the carton. To protect the contents of a carton which has been opened, a closure member is provided as hereinafter described and illustrated on the drawing, of which:

Figure 1:
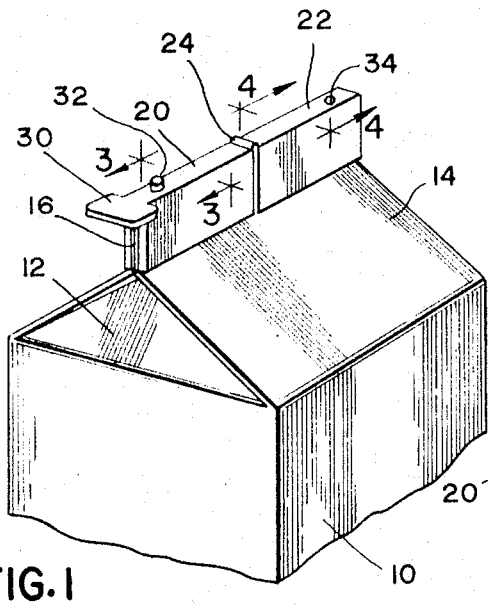
FIGURE 1 is a perspective view of the upper portion of a typical milk carton having thereon a closure device embodying the invention.
Figure 2:
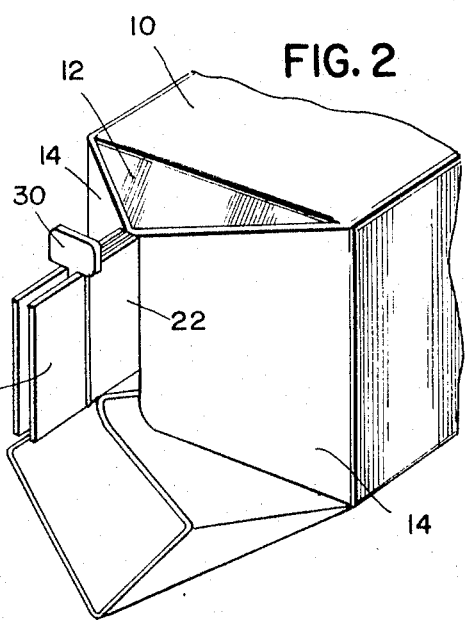
FIGURE 2 is a perspective view of the same in a different position and with the spout open.
Figure 3:
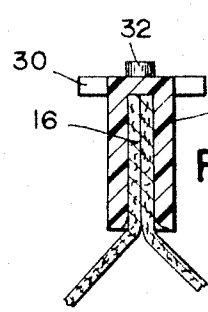
FIGURE 3 is a magnified section on the line 3—3 of FIGURE 1.

The upper portion of a conventional milk carton 10 is shown on the drawing. It is an upright rectangular cardboard box coated with a synthetic resin to make it fluid-tight. The upper portions of the front and rear walls are folded in as at 12 so that the corresponding portions 14 of the side walls converge to form a gable terminating in a top ridge 16 which consists of the top margin of the front and rear walls doubled and pressed between the top margins of the side walls 14. These top margins are all sealed together to make a fluid-tight container. When delivery of some or all of the contents of the carton therefrom is desired, the forward half of the ridge 16 is split apart so that the inwardly folded portion 12 of the front wall can be reversely folded outward to form a pouring spout as illustrated in FIGURE 2. After the desired portion of the contents has been poured out, the front wall 12 is folded in again and the parts of the forward half of the ridge 16 are brought together to close the carton. The nature of the cardboard, however, is such that such closing is usually not complete, a gap being left through which air has access to the interior, together with whatever bacteria, dust, odors and the like may be carried by the air.

To make the closure complete, I provide a clamp to be mounted on the ridge 16 in such a way that in its active position it pinches together the split forward half of the ridge to make a tight closure. It can be moved to an inactive position while still mounted on the carton so as to permit the carton to be opened. Thus it remains attached to the carton until the carton has been emptied and is ready to be discarded.

One embodiment of the invention comprises an inverted channel member 20 adapted to fit snugly over the forward half of the ridge 16 and thus to clamp the split portions of the forward half of the ridge tightly together.

Figure 4:
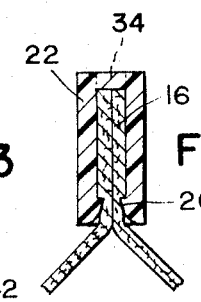
FIGURE 4 is a magnified section on the line 4—4 of FIGURE 1.

In order to retain the member 20 attached to the carton until the latter is ready to be discarded, a gripping means comprising a second inverted channel member 22 is mounted on the rear half of the ridge 16, the two channel members 20 and 22 being connected by a hinge 24 which may conveniently be a very thin and flexible strip of suitable material extending from the top surface of the member 22 to the top surface of the member 24. This hinge may be of the same moldable plastic material as that of which the members 20 and 22 are made. To anchor the channel member 22 more securely on the ridge 16, a slight constriction may be provided as indicated at 26 (FIGURE 4).

A finger tab 30 is formed at the forward end of the device to facilitate swinging the closure member 20 up and back to get it out of the way when the spout is to be opened. The inactive position of the member 20 is shown in FIGURE 2. Friction means to hold the member 20 releasably in its inactive position is provided. This may be in the form of a small stud 32 which fits snugly in a hole 34 in the top of the member 22, the stud and hole being equally distant from the hinge 24.

Figure 6:
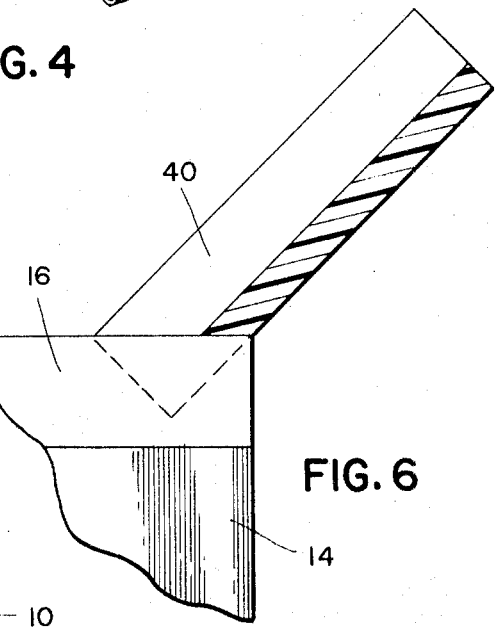
FIGURE 6 is a fragmentary elevational view of a carton with a sectional view of the closure device shown in FIGURE 5, the device being shown in an inactive position.
Figure 5:
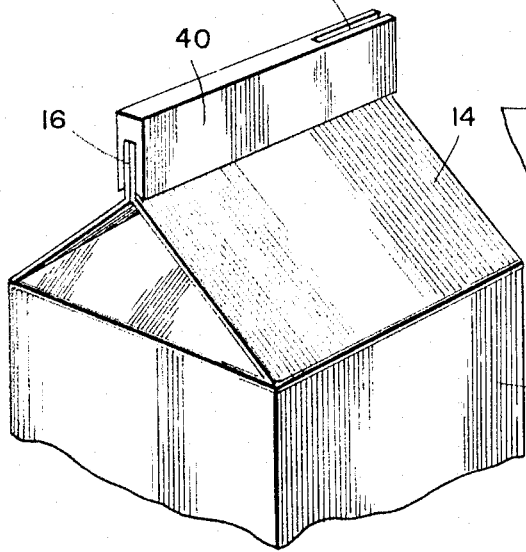
FIGURE 5 is a perspective view of the upper portion of a milk carton having thereon a closure device embodying a modified form of the invention.

A modified form of closure member is shown in FIGURES 5 and 6. This consists of a single channel member 40 adapted to fit closely over the top ridge 16. A rear portion of this channel member is slotted as at 42 for a short distance from the rear end so that the member 40 can be swung up and backward to an inactive position indicated in FIGURE 6 without becoming detached from the carton. It is thus a virtual part of the carton until the carton is empty and ready to be discarded.

I claim:
1. A closure device for a milk carton having a top ridge, said device comprising an inverted channel element adapted to fit snugly on the forward portion of the carton, a second channel element mountable on the rear portion of said ridge, hinge means connecting said channel elements whereby the first said channel element can be moved to an inactive position without being detached from the carton, and elements on the two said channel members mutually and frictionally engageable when the first said channel member is moved to its inactive position to retain it releasably in said inactive position.

References Cited

UNITED STATES PATENTS 2,058,592 10/1936 Ygger _____ 229—65
2,158,097 5/1939 Wentz.
3,217,967 11/1965 Jackson.

DAVID M. BOCKENEK, Primary Examiner

U.S. Cl. X.R.
229—17, 47